US005942752A

United States Patent [19]

Wang

[11] Patent Number: 5,942,752

[45] Date of Patent: Aug. 24, 1999

[54] HIGHER PRESSURE ION SOURCE FOR TWO DIMENSIONAL RADIO-FREQUENCY QUADRUPOLE ELECTRIC FIELD FOR MASS SPECTROMETER

[75] Inventor: Mingda Wang, Walnut Creek, Calif.

[73] Assignee: Hewlett-Packard Company, Palo Alto, Calif.

[21] Appl. No.: 08/857,431

[22] Filed: May 16, 1997

Related U.S. Application Data

[60] Provisional application No. 60/017,462, May 17, 1996.

[51] Int. Cl.$^6$ .............................. H01J 49/00; B01D 59/44

[52] U.S. Cl. .............................................. 250/288; 250/292

[58] Field of Search ..................................... 250/281, 282, 250/292, 288

[56] References Cited

U.S. PATENT DOCUMENTS

| | | | |
|---|---|---|---|
| 4,137,750 | 2/1979 | French et al. | 73/23 |
| 4,234,791 | 11/1980 | Enke et al. | 250/296 |
| 4,540,884 | 9/1985 | Stafford et al. | 250/282 |
| 4,885,500 | 12/1989 | Hansen et al. | 250/292 |
| 4,963,736 | 10/1990 | Douglas et al. | 250/292 |

(List continued on next page.)

FOREIGN PATENT DOCUMENTS

| | | | |
|---|---|---|---|
| 0736894A2 | 10/1996 | European Pat. Off. | H01J 49/42 |
| 0813228A1 | 12/1997 | European Pat. Off. | H01J 49/10 |

OTHER PUBLICATIONS

Fountain, S.T. et al.., "Mass–selective Analysis of Ions in Time–of–flight Mass Spectrometry using an Ion–trap Storage Device", Rapid Communications in Mass Spectrometry, vol. 8, 1994, pp. 487–494.

(List continued on next page.)

*Primary Examiner*—Bruce C. Anderson

[57] ABSTRACT

The present invention concerns an improved method and apparatus for analyzing and detecting a charge-neutral sample, which method comprises:

(A) conveying a charge-neutral sample as a gas optionally in an inert carrier gas into a radio frequency-only quadrupole wherein said gas sample within said quadrupole is ionized into multiple ions which are focused and dampened by multiple collisions with the carrier gas or a damping gas toward the z-axis of said quadrupole at a pressure of between about $10^{-1}$ and about $10^{-4}$ torr; and (B) conveying the ionized focussed gas sample through a focusing element into a mass analyzing quadrupole mass spectrometer which is controlled by both radio frequency and DC; and (C) detecting and measuring the level of the multiple ions produced to create a mass spectrum. The present invention also relates to an improved method and apparatus for analyzing a charge-neutral sample, which method comprises:

(a) obtaining a charge-neutral sample;

(b) evaporating the sample in a gas chromatograph;

(c) conveying the evaporated gas sample in an inert carrier gas into a radio-frequency-only quadrupole wherein said gas sample within said quadrupole is ionized into multiple ions which are focused by multiple collisions with the carrier gas at a pressure of between about $10^{-1}$ torr and $10^{-4}$ torr;

(d) conveying the ionized focused gas sample of step (c) through a focusing element into a mass analyzing quadrupole mass spectrometer which is controlled by both radio frequency and DC; and (e) detecting and measuring the level of the multiple ions produced to create a conventional mass spectrum. The present invention produces improved resolution and sensitivity as compared to conventional MS/MS systems. The improved method is less time consuming and costs less than conventional MS/MS systems.

29 Claims, 4 Drawing Sheets

U.S. PATENT DOCUMENTS

| | | | |
|---|---|---|---|
| 5,179,278 | 1/1993 | Douglas | 250/292 |
| 5,248,875 | 9/1993 | Douglas et al. | 250/282 |
| 5,576,540 | 11/1996 | Jolliffe | 250/292 |

OTHER PUBLICATIONS

S. C. Davis et al., in 1990 in *Rapid Communications in Mass Spectrometry*, vol. 4, pp. 186 to 197 disclose computer modelling of fragmentation processes in radio–frequency multiple collision cell. Ions are injected into and through the cell into an MS/MS instrument.

M. Morris, et al., in 1993 in *Rapid Communications in Mass Spectrometry*, vol. 7, pp. 1136 to 1140 disclose triple quadrupole mass spectrometry of low–energy ion/molecules products from collision with ammonia.

M. Morris, et al., in 1994 in the *Journal of the Americn Society of Mass Spectrometry*, vol. 5, pp. 1042 to 1063 disclose n RF–only quadrupole collision cell for use in tandem mass spectrometry as a component of a triple quadrupole mass spectrometer.

B. A. Thomson et al., in 1995 in *Analytical Chemistry*, vol. 67, No. 10, pp. 1696 to 1704 disclose improved collisionally activated dissolution efficiency and mass resolution using a triple quadrupole mass spectrometer.

K. Whelan, et al., in 1995 in *Rapid Communications in Mass Spectrometry*, vol. 9, pp. 1366 to 1375 disclose ion dissociation reactions included in a high pressure quadrupole collision cell for a triple quadrupole mass spectrometer system.

D. Douglas, et al., in *Journal of American Society of Mass Spectrometry*, vol. 3, on p. 399, published in 1992.

W. McFadden in *Techniques of Combined Gas Chromatography/Mass Spectrometry: Applications in Organic Analysis*, published by John Wiley And Sons, New York, New York in 1973.

R.E. March and R.J. Hughes, *Quadrupole Storage Mass Spectrometry*, published by John Wiley & Sons, New York, New York in 1989.

Student Handbook, *MS Fundamentals*, published by Hewlett Packard Company, Palo Alto, California in 1993, pp. 4–9 to 4–10.

HIGHER PRESSURE ION SOURCE FOR TWO DIMENSIONAL RADIO-FREQUENCY QUADRUPOLE ELECTRIC FIELD FOR MASS SPECTROMETER

RELATED APPLICATION

This application claims priority from U.S. provisional patent application Ser. No. 60/017,462 filed May 17, 1996, which is incorporated herein by reference in its entirety.

BACKGROUND OF THE INVENTION

1. Field of the Invention

The present invention provides an improved method and apparatus having improved sensitivity and detection of multiple ions produced from an evaporated sample in an RF-only quadrupole ion source in a carrier gas. The ions are optionally focused and are then conveyed to a RF/DC quadrupole mass spectrometer and are analyzed and detected to produce a mass spectrum. The present invention also concerns the improved sensitivity and improved detection of ions using gas chromatography coupled with mass spectrometry (GC-MS). In particular, the improved method relates to the injection of a sample of a neutral gas, preferably from a gas chromatograph, into a first radio-frequency (RF)-only controlled quadrupole which contains a carrier gas, such as helium, followed by ionization of the gas sample. The produced ions are then conveyed to an RF and direct current (DC) quadrupole mass spectrometer, and the ions passing through this quadrupole are detected in order to produce a mass spectrum.

2. Description of Related Art

It is well known that ion transmission and mass resolution in a quadrupole mass filter analyzer are related to the phase space distribution of ions entering the quadrupole mass filter. If the phase space distribution is larger than the phase space acceptance ellipse of the quadrupole mass filter, only a portion of the ions can pass through the mass analyzer. In an x,y,z coordinate system for a quadrupole, the z axis is essentially the central axis within the space created by the quadrupole electrodes. In the traditional GC-MS ion source, most ions are formed off the z axis. Though sophisticated static lenses help to focus the ions to near the z axis, only a small portion of the ions fall inside of the phase space acceptance ellipse; thus, only a small portion of the ions pass through the mass filter analyzer for detection. Space charges, especially the higher ion concentration of carrier gas in a GC-MS mass spectrometer system, further prevent ions from being focused to near the z axis.

Methods which improve resolution in quadrupole mass filters have been used in the collision induced dissociation of mass spectrometry/spectrometry (MS/MS). The focus effect of collision damping in a quadrupole field is well known. See G. C. Stafford et al., U.S. Pat. No. 4,540,884 and D. J. Douglas et al., *Journal American Society for Mass Spectrometry*, Vol. 3, p. 398, (1992). Douglas et al., in U.S. Pat. No. 5,248,875, titled "The Method for Increased Resolution in Tandem Mass Spectrometry", propose to focus fragment ions of collision induced dissociation (CID) with a high pressure collision cell, composed of an RF quadrupole field. As a result, transmission rates and mass resolution of fragment ions in the third quadrupole mass analyzer are increased.

A more detailed discussion of this prior art is helpful to show the advance of the improved method of the present invention.

U.S. Pat. No. 5,248,875—FIG. 1 herein is FIG. 1 from U.S. Pat. No. 5,248,875 which issued on Sep. 28, 1993 and shows in schematic representation the prior art triple quadrupole mass spectrometer 10. It is commercially available from SCIEX DIVISION of MDS Health Group Limited of Thornhill, Ontario, Canada, under the trademark API IV and the Perkin Elmer Corp. of Norwalk, Conn. The mass spectrometer 10 has a conventional ion source 12 which produces ions and directs the ions to an inlet chamber 14. These ions in chamber 14 are directed through orifice 16, a gas curtain chamber 18 (see, e.g., U.S. Pat. No. 4,137,750), a set of RF only rods 20 as a transportation component and then through first, second and third quadrupoles Q1, Q2, and Q3 respectively. As is conventional, quadrupole Q1 and Q3 each have both RF and DC applied between their respective opposing pairs of rods and act as mass filters. Quadrupole Q2 is of an open structure (formed from wires) and has RF only applied to its rods.

The primary advance of U.S. Pat. No. 5,248,875 is the enclosing of quadrupole Q2 in a container as is shown as its FIG. 8 and is shown herein as FIG. 6. In FIG. 6 the quadrupole Q2 is enclosed in a container (shell) 50 so that the pressure or gas from source 22 can be controlled independently from the pressure or gas of the remainder of the system. The quadrupole rods 24 (or 24A) of Q2 may be solid rods. Container 50 has entrance aperature 52 and exit port cylindrical body 55. Aperature 52 and 54 are electrically isolated from each other and from the body 55. The pressure in shell 50 is controlled by changing the size of the aperture 52 and 54.

In the first quadrupole Q1, the desired parent ions are selected, by setting an appropriate magnitude and a ratio of RF to DC on its rods. In a second quadrupole Q2, collision gas from source 22 is sprayed across the rods 24 of quadrupole Q2 to create a collision cell in which the parent ions entering Q2 are fragmented by collision with the added gas. Q3 serves as a mass analyzing device and is scanned to produce the desired mass spectrum. Ions which pass through Q3 are detected at detector 26. The ions impinging upon detector 26 are used to create the well known mass spectrum.

The quadrupoles Q1, Q2, and Q3 and RF only rods 20 are optionally housed in a chamber 27 which is evacuated by a cryopump 28 having a cryosurface 29 encircling rods 20 and another cryosurface 30 encircling Q2. It is noted that while FIG. 1 illustrates a typical presently available commercial MS instrument which is competitive with other available triple quadrupole mass spectrometers, the details of construction can of course vary somewhat. For instance, conventional vacuum pumps can be used instead of cryopumps. This patent does not teach or suggest the introduction of a charge-neutral sample into a quadrupole for ionization and focusing.

Douglas et al.,—In FIG. 2 herein (taken from FIG. 1 of *J. Amer. Soc. Mass. Spec., Vol.* 3, p. 399 (1992)), the analyzing system is shown as 100. Ions are sampled from an atmospheric ion (API) source 112 (either a corona discharge or an ion spray), through opening 116 through nitrogen curtain gas in area 118 through sampling opening 19 into a region 19A containing an RF quadrupole Q0. Daughter ions are produced within region 19A in quadrupole Q0 which pass through the interquad aperture IQ into the RF and DC analyzing quadrupole mass spectrometer Q1. The ions are detected at Y0. Ion counting is used and the mass spectra are collected and created in a commercial multichannel scaler. Diffusion pumps DP1 and DP2 are used to obtain the vacuum of $5\times10^{-6}$ to $3\times10^{-5}$ torr. A backup pump BP is used to maintain a useful vacuum at all times. This reference does not teach or suggest the introduction of a charge-neutral sample into a quadrupole for ionization and focusing.

In a conventional quadrupole mass filter, as a consequence of the oscillating field, a positive ion injected into the quadrupole region will oscillate between the adjacent electrodes of opposite polarity. At a specified radio frequency (RF) and specified magnitudes of RF and DC, ions of a given mass undergo stable oscillation between the electrodes. Ions of higher or lower mass undergo oscillation of increasing amplitude until they collide on the quadrupole electrodes and are not detected further. The ion with a stable oscillation continues at its original velocity down the flight path of the quadrupole to the collector/multiplier for detection and analysis.

In theory, the resolution of a quadrupole mass filter can be increased to a high value by selecting the ratio of the constant DC component to a radio frequency ($U/V_0$) where U is defined as the DC amplitude in volts applied between opposite pairs of electrodes, and $V_0$ is defined as the radio frequency amplitude in volts, close to the apex of the stability region. In practice, however, a significant percentage of the selected ions oscillate with a significant amplitude to strike a quadrupole electrode and thus reduce the efficiency of the transmission. The errant motion depends on a number of factors, such as the velocity component in the x and y direction and upon the position at which the ion enters the quadrupole electrode cavity. Also, the alignment of the electrodes must be very precise and the electrodes must be free from any non-conducting film (such as pump oil, excess condensation and the like) that would distort the symmetric field.

For a review of this field, see R. E. March and R. J. Hughes, *Quadrupole Storage Mass Spectrometry*, published by John Wiley & Sons, New York, N.Y. in 1989.

Additional related art of interest includes, for example:

S. C. Davis et al., in 1990 in *Rapid Communications in Mass Spectrometry*, Vol. 4, pp. 186 to 197 disclose computer modelling of fragmentation processes in radio-frequency multiple collision cells. Ions are injected into and through the cell into an MS/MS instrument.

M. Morris et al., in 1993 in *Rapid Communications in Mass Spectrometry*, Vol. 7, pp. 1136 to 1140 disclose triple quadrupole mass spectrometry of low-energy ion/molecule products from collision with ammonia.

M. Morris et al., in 1994 in the *Journal of the American Society of Mass Spectrometry*, Vol. 5, pp. 1042 to 1063 disclose an RF-only quadrupole collision cell for use in tandem mass spectrometry as a component of a triple quadrupole mass spectrometer.

B. A. Thomson et al., in 1995 in *Analytical Chemistry*, Vol. 67, No. 10, pp. 1696 to 1704 disclose improved collisionally activated dissolution efficiency and mass resolution using a triple quadrupole mass spectrometer.

K. Whelan et al., in 1995 in *Rapid Communications in Mass Spectrometry*, Vol. 9, pp. 1366 to 1375 disclose ion dissociation reactions included in a high pressure quadrupole collision cell for a triple quadrupole mass spectrometer system.

None of these patents or articles individually or collectively teach or suggest the present invention.

All articles, references, patents, patent applications, provisional patent applications, standards, and the like cited herein are incorporated by reference in their entirety.

As can be seen from the discussion herein, a need exists for a simple method and apparatus to ionize a neutral gas sample in a carrier gas within an RF-only quadrupole followed by collection and detection using a RF/DC quadrupole mass spectrometer. The present invention provides a solution for this need.

SUMMARY OF THE INVENTION

The present invention concerns an improved method of analyzing and detecting a sample, preferably a charge-neutral sample, which method comprises:

(A) conveying a charged or neutral sample, preferably a charge-neutral gas sample, optionally in an inert carrier gas, into a radio frequency-only quadrupole having a central z-axis wherein said gas sample within said quadrupole is ionized into multiple ions which are dampened and focused by multiple collisions with the carrier gas or damping gas toward the z-axis of said quadrupole at a pressure of between about $10^{-1}$ and about $10^{-4}$ torr; and (B) conveying the ionized focused gas sample, optionally through a focusing element, into a mass analyzing quadrupole mass spectrometer which is controlled by both radio frequency and DC; and (C) detecting and measuring the level of the multiple ions produced to create a mass spectrum.

The present invention also relates to an improved method of analyzing a sample, preferably a charge-neutral sample, which method comprises:

(a) obtaining a sample (liquid or gas) preferably a charge-neutral sample;

(b) evaporating the sample if necessary in a gas chromatograph;

(c) conveying the evaporated sample in a carrier gas into a radio frequency-only quadrupole wherein said evaporated sample within said quadrupole is ionized into multiple ions which ions are focused by multiple collisions with the carrier gas or a damping gas at a pressure of between about $10^{-1}$ torr and about $10^{-4}$ torr;

(d) conveying the ionized focused gas sample of step (c) through a focusing element into a mass analyzing quadrupole mass spectrometer which is controlled by both radio frequency and DC; and (e) detecting and measuring the levels of the multiple ions produced to create a mass spectrum.

The present invention relates also to an apparatus configuration comprising a higher pressure 2-dimensional quadrupole field (RF only and RF+DC) as an ion source (see FIG. 3) for a quadrupole mass filter analyzer and a GC-MS mass spectrometer system. Compared with the use of conventional pressure levels inside a quadrupole field ($10^{-4}$ to $10^{-5}$ torr), the ion source pressure in the present invention is intentionally raised to about $10^{-1}$ torr to about $10^{-4}$ torr, such as by restricting the carrier gas (GC/MS)/collision gas flow out of the ion source region. The quadrupole electrodes form part of the enclosure which restricts carrier gas from escaping as shown in FIG. 3. Alternatively, the higher pressure in the ion source can be achieved by placing the whole ion source in a housing which is evacuated.

DETAILED DESCRIPTION OF THE INVENTION AND PREFERRED EMBODIMENTS

Definitions

As used herein:

"Carrier gas" refers to those inert gases (i.e., do not react with the sample) which are conventionally used in gas chromatography separations and in mass spectrometer analyses. Preferred gases include for example, helium, hydrogen, neon, nitrogen, argon, and mixtures thereof. Helium is preferred.

"Damping gas" refers to the inert gas within the quadrupoles. The multiple ions produced collide with the damping gas and are focused toward the z axis. The damping gas may be the same gas or a different gas as the inert carrier gas.

"Neutral" refers to a sample liquid or gas which is essentially still non-ionized (uncharged), for example, as a neat gas or as the gas exiting a conventional gas chromatograph.

"Sample gas" refers to the sample to be analyzed when it is in the gas form. The sample may be a liquid at ambient conditions, but is vaporized for separation and analysis as is described herein.

Figure 1:
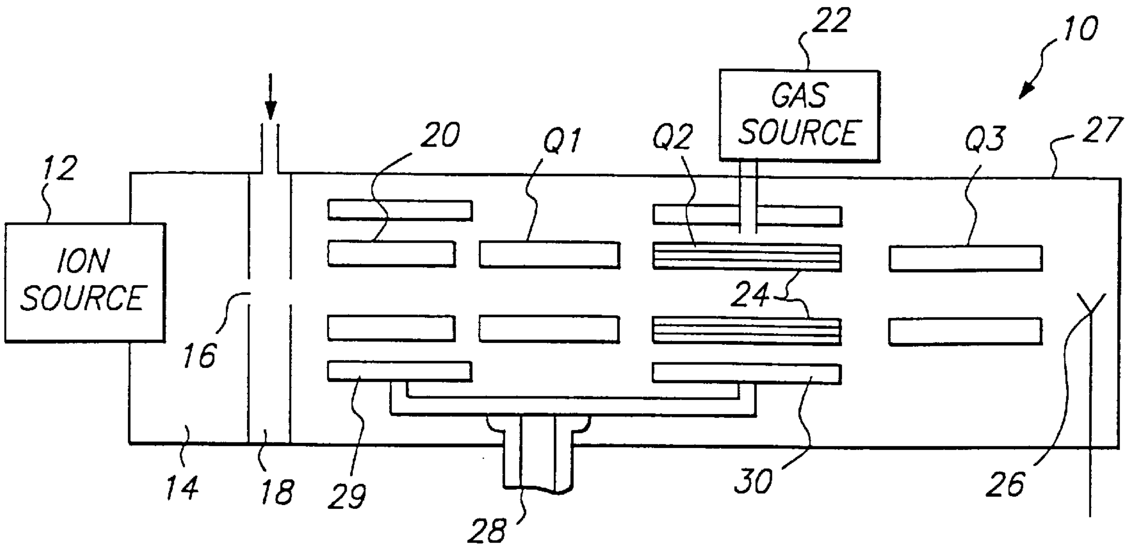
FIG. 1 (PRIOR ART)
FIG. 1 is a schematic representation of a conventional triple quadrupole mass spectrometer of the prior art. It is FIG. 1 of U.S. Pat. No. 5,248,875.
Figure 2:
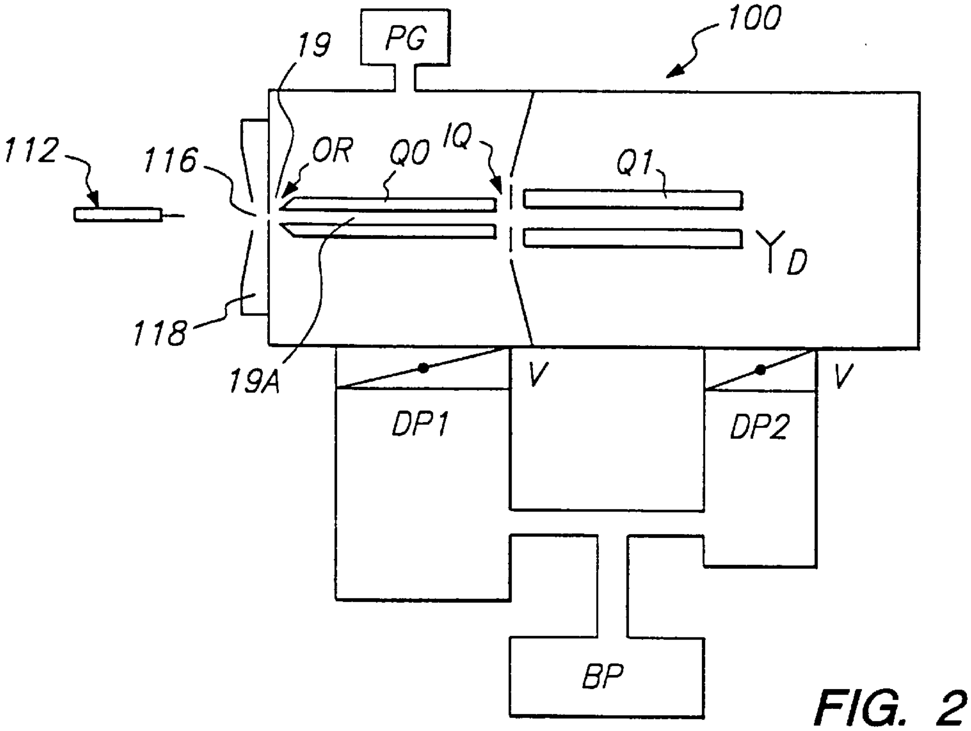
FIG. 2 (PRIOR ART)
FIG. 2 is a schematic representation of a prior art apparatus. It is FIG. 1 as found in D. Douglas et al., in *Journal of American Society of Mass Spectrometry*, Vol. 3, on p. 399, published in 1992.
Figure 3:
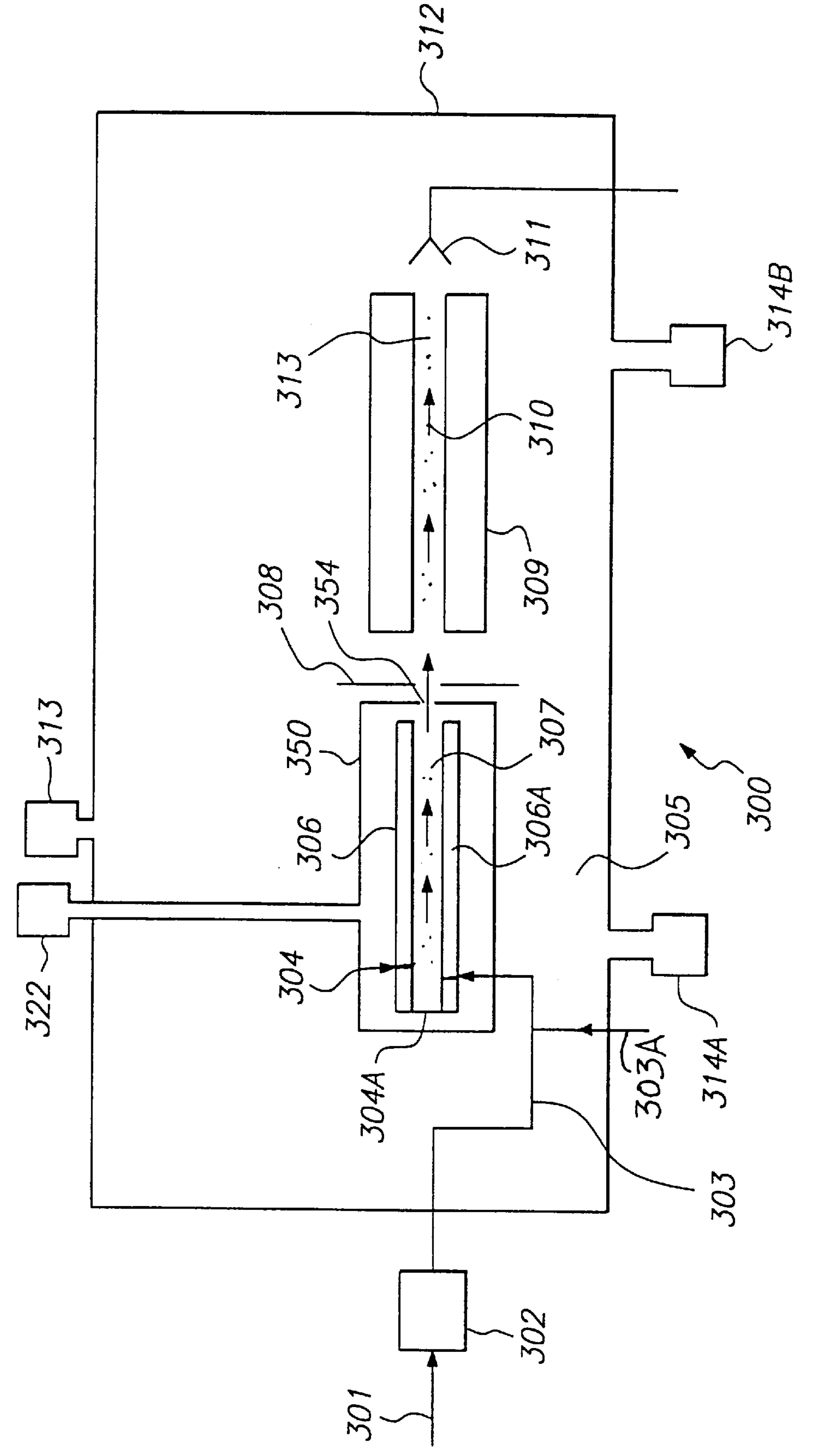
FIG. 3 is a representation of the configuration of the initial charge-neutral gas sample, RF-only quadrupole and RF/DC quadrupole mass spectrometer useful for the present invention.

The Present Invention—In the broadest sense in FIG. 3, the present invention provides an improved method and apparatus to analyze and detect an evaporated sample, preferably a volatile organic compound. The evaporated sample is batch injected (either neat or using a carrier gas) into an RF-only quadrupole ion source 306 and 306A. Multiple ions of the sample are produced. The multiple ions are dampened by the carrier and/or a damping gas 303A toward the z axis, optionally focused 308 and then conveyed to an RF/DC quadrupole mass spectrometer 309, and analyzed and detected to produce a mass spectrum. The improved sensitivity and detection obtained are each between about twice and 10 times the conventional sensitivity and detection. The discussion below is for the use of a gas chromatograph with a mass spectrometer. The method of detection and analysis is the same whether or not the evaporated sample is batch injected or is purified, e.g., by a gas chromatograph.

GC/MS—The arrangement of components for the invention (mass spectrometer 300) is shown in FIG. 3. The charge-neutral liquid or gas sample 301, optionally in solution, is vaporized, transported and optionally purified (separated) by gas chromatograph 302. The carrier gas of the gas chromatograph can be helium, hydrogen, nitrogen, neon, argon any the like. The charge-neutral sample gas/carrier gas mixture (303) proceeds into a RF-only quadrupole 306 and 306A. The sample gas is ionized into multiple ions by electron beam 304 in the RF field 307. The temperature in this RF-only quadrupole is usually between 20° C. and 350° C., and the pressure is between about $10^{-1}$ torr and about $10^{-4}$ torr, preferably between about $10^{-1}$ and about $10^{-3}$ torr, and more preferably between about $10^{-2}$ and about $10^{-3}$ torr. When ion fragments move toward ion focus lens 308, sample ions converge to the central z-axis of the RF-field 307 due to collision damping with carrier and/or damping gas, and unwanted carrier gas ions diverge from the central z-axis and collide with the electrodes. The ion fragments then pass through ion focus lens 308 into RF and DC quadrupole mass spectrometer 309. Ion fragments 310 travel through quadrupole 309 and are separated by mass to charge ratio by the RF and DC fields. The multiple ions are collected and detected using conventional detector 311 and are used to produce a mass spectrum. The entire system may be optionally enclosed in a housing 312 which is maintained under vacuum by pump 313 and optionally back up pumps 314A and 314B.

The quadrupole 306 and 306A may also be enclosed in its own shell (housing) 350 having an outlet 354 and vacuum or carrier and/or damping gas source 322. In this way, the pressure or gas for quadrupole 306 and 306A is independent of the pressure or gas within container 312. The operating parameters of RF field 307 are usually between about 50 kHz and 5 MHz with its amplitudes corresponding to cut off ions of mass 2 amu and up. The optional DC voltage of between ±200 V may be applied to the two pairs of electrodes.

Mass sizes for the charge neutral gas sample are usually between about 4 and 2,000 atomic mass units, (amu), preferably between about 50 and 1000 amu. The ion fragments are obtained from these neutral molecules.

With the new ion source, electron bombardment ionization (EI) or chemical ionization (Cl) fragment ions of the sample are focused near to the z axis by collision damping with the carrier gas. The phase space distribution of the ions are therefore narrower than that in a traditional ion source. Thus both detection sensitivity and mass resolution of the mass analyzer are increased.

Figure 4A:
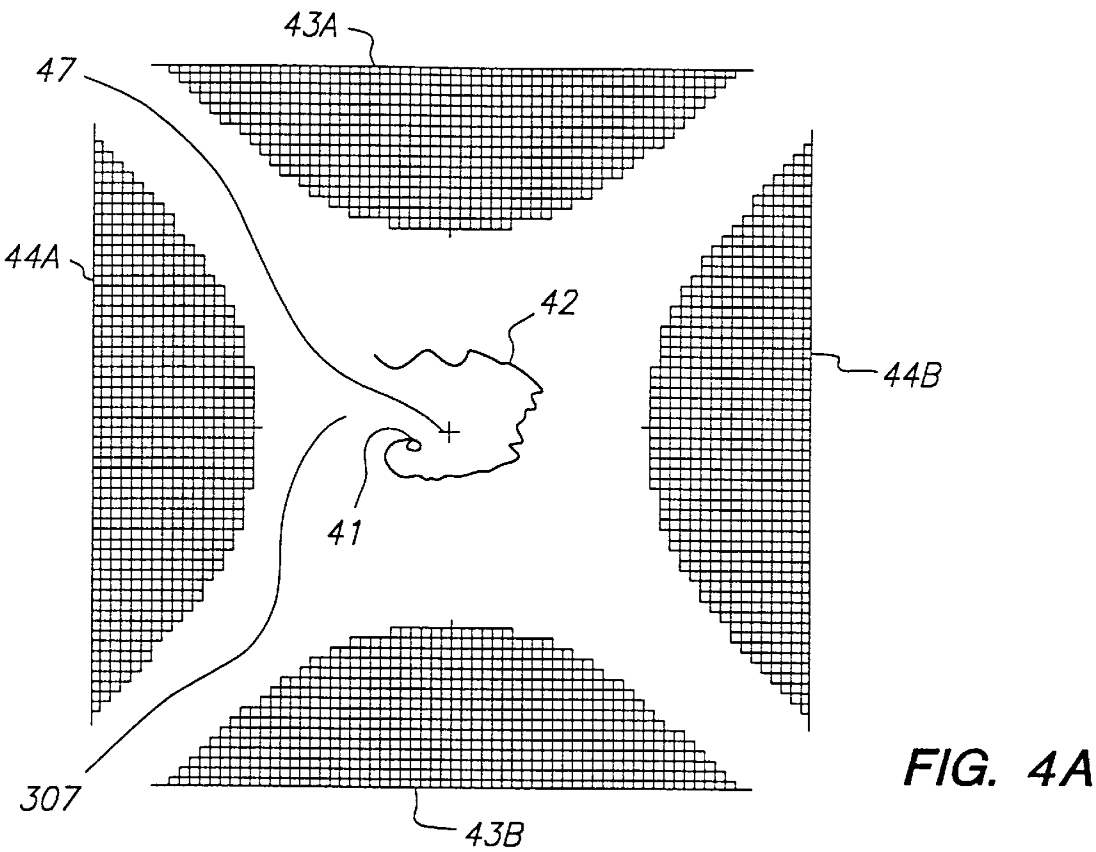
FIG. 4A is a cross sectional schematic representation of an ion of mass 69 amu focused to the center 3-axis of the quadrupole field by collision damping.
Figure 4B:
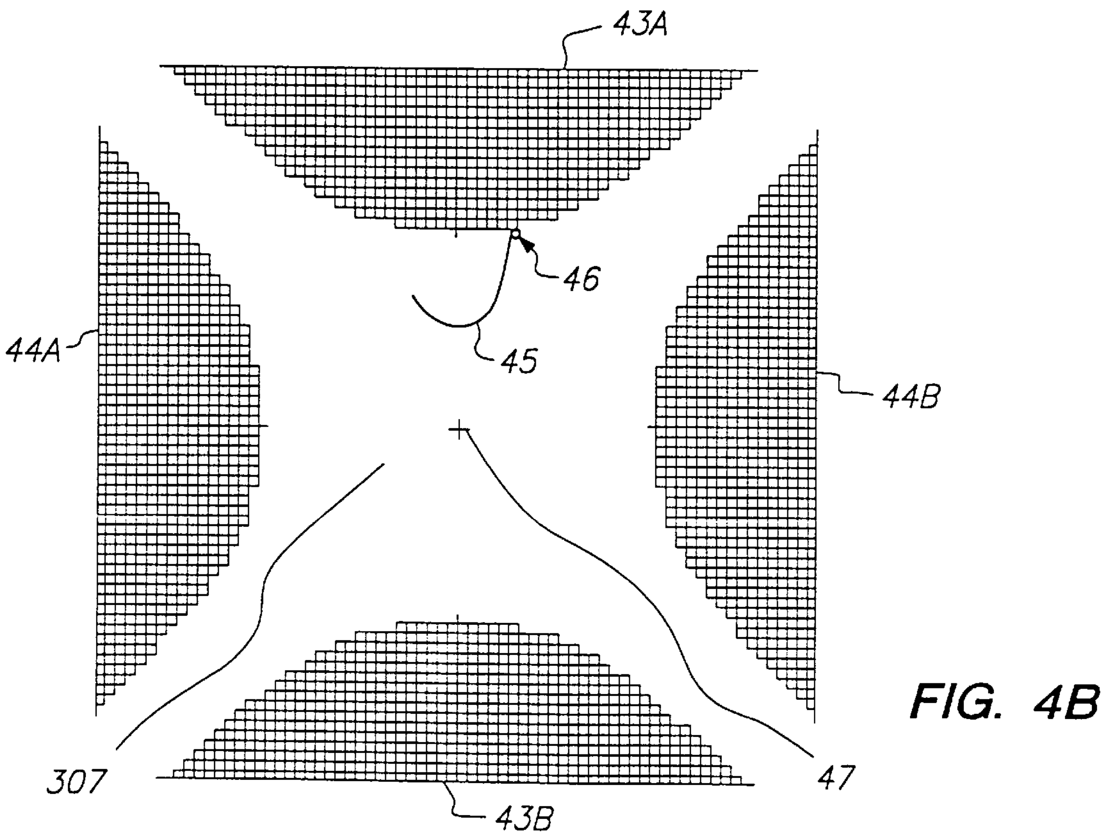
FIG. 4B is a cross sectional schematic representation of the quadrupole field of FIG. 4A wherein an ion of mass 4 amu strikes one of the quadrupoles and is ejected by the RF field.

In the present invention, the selected ejection of carrier gas ions or other undesired fragment ions is enforced by mapping these ions outside the stability diagram or other means of ejection methods, such as resonance ejection (see R. E. March review, supra). The ejection of carrier gas ions specially benefits GC-MS mass analysis. FIG. 4A and FIG. 4B show a cross section of the RF-only quadrupole having opposed electrodes 43A and 43B and opposed electrodes 44A and 44B which create quadrupole field 307. The longitudinal z axis 47 (perpendicular to the plane of FIGS. 4A and 4B) is found at the center of the field 307 created by the quadrupole rods and extends the length of the rods. A similar z axis is found in quadrupole 309 in field 313. FIG. 4A shows a simulated trajectory 42 of an ion 41 with mass of 69 amu, in which ion 41 gradually moves towards the z-axis by collision damping with the helium in an RF-only quadrupole field 307. FIG. 4B illustrates the trajectory 45 of an ion 46, with mass of 4 amu, e.g. helium carrier gas, under the same initial and operating conditions. The ion 46 with mass of 4 amu is unstable and contacts electrode 43A and thus is not measured.

For a conventional Hewlett-Packard Model 5973 MSD®, (GC-MS) the operating parameters are an RF field of between about 0 to 1.8 kv at a frequency of 1 MHz and a DC voltage of between about −250 and +250 V.

Figure 5:
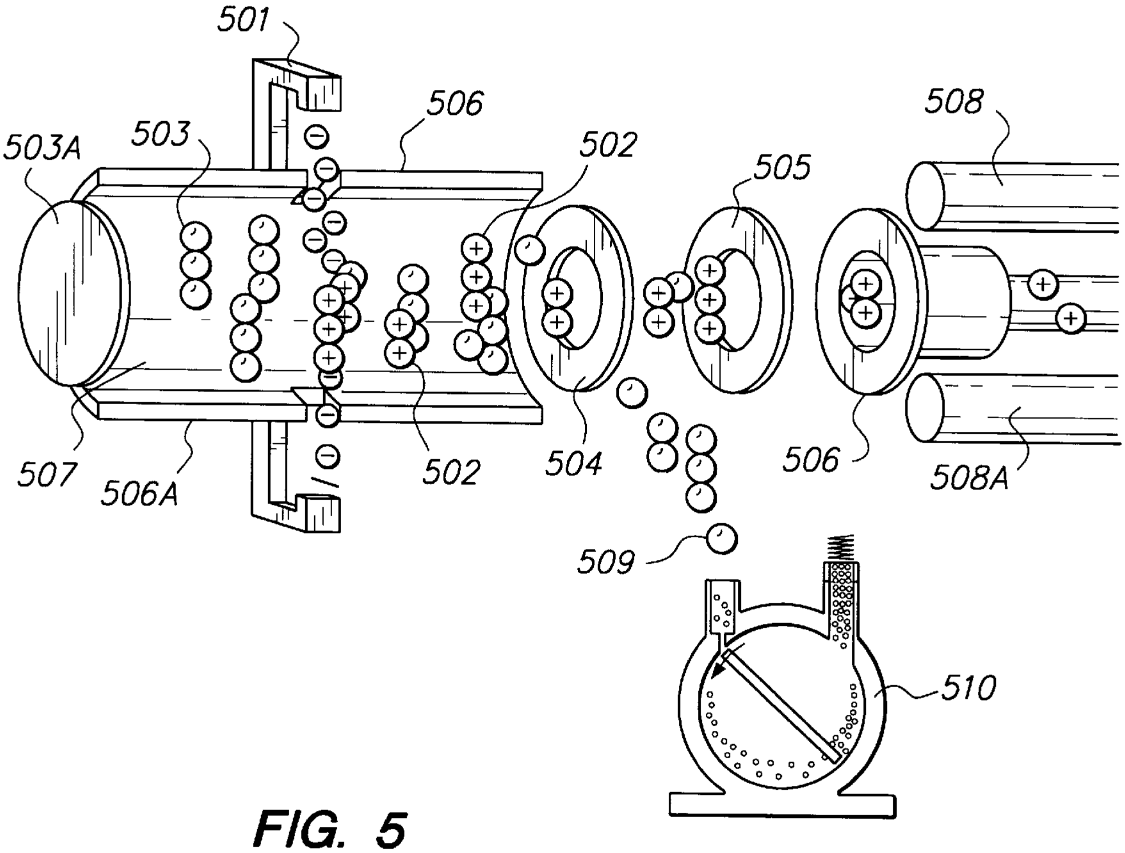
FIG. 5 (PRIOR ART)
FIG. 5 a schematic representation of a conventional ion source and RF-DC quadrupole mass filter.
Figure 6:
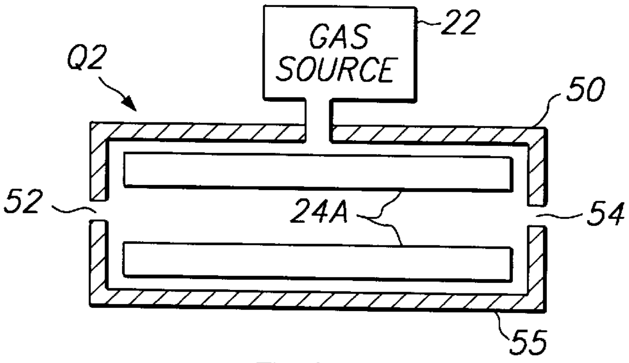
FIG. 6 (PRIOR ART)
FIG. 6 a schematic representation of the isolation of quadrupole Q2 in a housing to dependently control pressure or gas. (See FIG. 8 of U.S. Pat. No. 5,248,875).

FIG. 5 shows the schematic configuration of a conventional ion source, lenses and the RF-DC quadrupole in GC-MS mass spectrometry. The repeller plate 503A forms one end of the ionization chamber 506. Repeller plate 503A can be charged with between about 10 to 35 volts. A stream of electrons is collimated by the field of magnet 501 and produces charged ions 502 and uncharged particles 503. The ions are directed through draw out plate 504, ion focus plate 505 and entrance lens 506. The RF-DC quadrupole 508 and 508A as a mass filter focuses the charged ions with increased sensitivity and detection. Uncharged particles 509 are drawn off by the vacuum system 510. This reference does not teach the use of a quadrupole to ionize a sample, dampen and focus the multiple ions.

The RF quadrupole in the above simulations (FIG. 4) is not an ideal quadrupole field. A quadrupole field with superimposed dipole or/and higher order RF fields, such as hexapole, octapole, et al., may also be used in the invention to focus ions under collision damping condition.

In FIG. 3, ions are moved out of the ion source along the z axis by an electric field in the z direction. Due to fringe effects, the RF electric field in the z direction is not a uniform RF field. It is clear that either ideal 2-dimensional or non-ideal 2-dimensional RF quadrupole field in the z direction is used in the present invention.

In addition, the 2-dimensional RF quadrupole field of the ion source in the invention may be replaced by a three dimensional RF quadrupole field with a superimposed DC static electric field in the z direction. Because of the superimposed DC static electric field in the invention, the ion source is able to operate in a continuous mode which is different from the pulse mode reported by Lubman (see *Rapid Communications in Mass Spectrometry* Vol. 8, p. 487, 1994).

It is not necessary that the 3-dimensional RF quadrupole field in the invention is an ideal RF quadrupole field and has a cylindrical symmetry.

Helium as a carrier gas is preferred. When the ions are created in the RF-only quadrupole, the collisions with the helium present cause the ions to lose some kinetic energy, thus damping the direction and speed of the ions. Because there are many helium molecules present, each collision causes a small amount of damping (as compared to a larger carrier gas molecule), and more collisions occur. In this way more ions are gradually focused near or on the z-axis. This phenomena improves the focus of the ions in the quadrupole, increases ion transmission yield in the second quadrupole field and therefore improves the detection and sensitivity of the sample gas.

It is well known that RF hexapole and RF octapole fields have the similar focus effect under collision damping condition. Thus, the RF-only quadrupole field in the invention can be replaced by a RF hexapole or octapole field.

In the present invention, the ion source pressure in step (A) or step (B) is between about $10^{-1}$ to $10^{-4}$ torr range, preferably between about $10^{-1}$ torr to about $10^{-3}$ torr, and more preferably between about $10^{-2}$ torr to about $10^{-3}$ torr.

In the invention, the amplitude of RF quadrupole field of the ion source can be fixed or varying when the quadrupole mass filter analyzer is scanning.

The frequency of the quadrupole field in the high pressure ion source can be the same or be different from the frequency of the quadrupole mass analyzer. The relative initial phase of the ion source and the mass filter analyzer RF fields may be optimized to a special value if the frequency ratio of the ion source and the mass filter analyzer RF fields is $n_1/n_2$, in which $n_1$ and $n_2$ are integer numbers.

In one embodiment, the improved method utilizes in step A a pressure between about $10^{-1}$ and about $10^{-3}$ torr and the radio frequency is between about 50 kHz and 5 MHz; and in step B, the amplitude of the radio frequency field is between about 0 and 4 kvolt at a 1 MHz frequency, the DC is between about −600 volt and +600 volt, preferably between about −400 volt and about +400 volt and the pressure is between about $10^{-1}$ torr and $10^{-5}$ torr. More preferably the DC is between about −200 volt and +200 volt.

In another embodiment the mass to charge ratio of the ions analyzed is between 4 and 2000 atomic mass units (amu).

In another embodiment, the improved method includes:

in steps (b) and (c) the pressure is between about $10^{-1}$ torr and about $10^{-3}$ torr and the radio frequency is between about 50 kHz and 5 MHz; and in step (d), the pressure is between $10^{-3}$ torr and about $10^{-6}$ torr, the radio frequency is about 1 MHz, and the DC is between about −600 and +600 volt, preferably between about −400 and +400 volt, and more preferably between about −200 volt and +200 volt.

In another embodiment, the improved method utilizes in step (c) a radio frequency of about 1 MHz, and in step (d) the radio frequency is about 1 MHz and the DC is between about −50 and +50 volt.

The following examples are presented only to explain and describe the present invention. They are not to be construed to be limiting in any way.

EXAMPLE 1

MS Analysis of Perfluorotributylamine

Perfluorotributylamine ($C_{12}F_{27}N$)—Perfluorotributylamine is used as a proof and calibration sample. The perfluorotributylamine neutral sample is evaporated at ambient temperature and is conveyed to the RF-only field corresponding to a cut off mass at 20 to 60 amu at a temperature of 200° C. and a pressure of between $10^{-2}$ and $10^{-3}$ torr. A helium gas stream is added. The perfluorotributylamine is ionized in the RF-only quadrupole mass spectrometer. The multiple ions produced are conveyed along the z-axis with helium damping and focusing, and are conveyed through a focusing opening into the analyzing scan from mass to 50 to 650 amu in a second quadrupole mass spectrometer at 200° C. at a pressure of between about $10^{-5}$ and $10^{-6}$ torr. The RF-only frequency is between about 100 kHz and 2 MHz. The RF frequency is 1 MHz DC and is between 0–200 volt for the second quadrupole. The mass spectrum is generated in the conventional manner.

EXAMPLE 2

GC-MS Analysis of Octafluoronaphthalene (a) Octafluoronaphthalene ($C_{10}F_8$)—Octafluoronaphthalene (10 picogram) in iso-octane as solvent is used as a proof and calibration sample. The sample and solvent are injected into a commercial Hewlett-Packard 6890 gas chromatograph having a commercial HP-5 capillary column (30 m×250 micrometer ID). The pressure is maintained using a commercial electronic pressure control device to maintain a carrier gas flow rate of 1.2 ml helium/min. The GC injection port temperature is 260° C. The column temperature is originally at 50° C. and is increased at 15° C./min to 260° C. and held at 260° C. The octafluoronaphthalene neutral sample in helium is injected through a helium gas corresponding to a cut off mass at 20 to 60 amu at a temperature of 200° C. and a pressure of between $10^{-2}$ and $10^{-3}$ torr. The gas chromatographic purified octafluoronaphthalene is ionized in the RF-only quadrupole mass spectrometer and is conveyed through a focusing opening into the analyzing scan from mass to 50 to 300 amu in the quadrupole mass spectrometer at 200° C. at a pressure of between about $10^{-5}$ and $10^{-6}$ torr. The RF-only frequency is between about 100 kHz and 2 MHz. The RF frequency is 1 MHz and DC is between about 0 and +200 volt for the second quadrupole. The mass spectrum is generated in the conventional manner.

(b) Similarly, when the method of Example 2(a) is repeated except that the octafluoronaphthalene is repeated with a stoichiometrically equivalent amount of tetrachlorobenzodioxin, a useful mass spectrum is obtained.

EXAMPLE 3

GC-MS of Polycyhlorinated Biphenyl

Dichlorobiphenyl ($C_{12}Cl_{10}$)—Dichlorobiphenyl—(10 picogram) in isooctane as solvent is used as a sample. It is injected into a commercial Hewlett-Packard 6890 gas chromatograph having a commercial DB-5 IMS column (30 m×250 micrometer ID). The pressure is maintained using a commercial electronic pressure control device to maintain a carrier gas flow rate of 1.2 ml helium/min. The GC injection port temperature is 260° C. The column temperature is originally at 50° C. and is increased at 15° C./min to 260° C. and held at 260° C. The dichlorodiphenyl neutral sample in helium is injected through a helium gas corresponding to a cut off mass at 20 to 60 amu at a temperature of 200° C. and a pressure of between $10^{-2}$ and $10^{-3}$ torr. The gas chromatographic purified dichlorodiphenyltrichloroethane is ionized in the RF-only quadrupole mass spectrometer and is conveyed through a focusing opening into the analyzing scan from mass to 50 to 550 amu in the quadrupole mass spectrometer at 200° C. at a pressure of between about $10^{-5}$ torr and about $10^{-6}$ torr. The RF-only frequency is between about 100 kHz and about 2 MHz. The RF frequency is 1 MHz and the DC is between about 0 and +200 volt for the second quadrupole. The mass spectrum is generated in the conventional manner.

EXAMPLE 4

GC-MS of a Gas Sample Containing Methylene Dichloride (a) The reaction of Example 2(a) is repeated except that octafluoronaphthalene is replaced with a stoichiometrically equivalent amount of methylene dichloride. A useful mass spectrum identifying methylene dichloride is obtained.

While only a few general embodiments of the invention have been shown and described herein, it will become apparent to those skilled in the art that various modifications and changes can be made to improve sensitivity and detection of ions, optionally using gas chromatography, with an RF quadrupole ion source and a RF/DC quadrupole mass spectrometry of a charge-neutral sample without departing from the spirit and scope of the present invention. All such modifications and changes coming within the scope of the appended claims are intended to be carried out thereby.

What is claimed is:

1. A method for analyzing a sample, which method comprises:

(A) conveying the sample as a charge-neutral gas, optionally in an inert carrier gas, into a radio frequency-only quadrupole having a z-axis wherein said gas sample within said quadrupole is ionized into multiple ions which are dampened and focused by multiple collisions and damping with the carrier gas or a damping gas toward the z-axis at a pressure between about $10^{-1}$ and about 10–4 torr; and (B) conveying the ionized focused gas sample optionally through a focusing element into a mass analyzing quadrupole mass spectrometer which is controlled by both radio frequency and DC voltage; and (D) detecting and measuring the levels of the multiple ions.

2. The method of claim 1 wherein in step A the pressure is between about $10^{-1}$ torr and about $10^{-3}$ torr and the radio frequency is between about 50 kHz and 5 MHz; and in step B the amplitude of the radio frequency field is between 0 and 4 kvolt at a 1 MHz frequency, the DC is between about −600 volt and about +600 volt, and the pressure is between about $10^{-1}$ torr and $10^{-5}$ torr.

3. The method of claim 2 wherein in step B the DC is between about −200 volt and about +200 volt.

4. The method of claim 1 wherein the inert carrier gas is selected from the group consisting of helium, hydrogen, nitrogen, neon, argon and mixtures thereof.

5. The method of claim 4 wherein the inert carrier gas is helium.

6. The method of claim 4 wherein in step (B) the pressure is between about $10^{-4}$ and about $10^{-5}$ torr.

7. The method of claim 1 wherein the mass to charge ratio of the ions analyzed is between about 4 and 2000 amu.

8. The method of claim 1 wherein the temperature in the RF-only quadrupole and in the RF-DC quadrupole is between about 20 and 350° C., and the DC is between about −400 volt and +400 volt.

9. The method of claim 1 wherein in step (B) the pressure is between about $10^{-4}$ and about $10^{-5}$ torr.

10. The method of claim 1 wherein the sample within said quadrupole is ionized by electron impact ionization.

11. The method of claim 1 wherein the sample within said quadrupole is ionized by chemical ionization.

12. A method for analyzing a sample, which method comprises:

(a) obtaining the sample in charge-neutral form;

(b) evaporating the sample in a gas chromatograph;

(c) conveying the evaporated charge-neutral gas sample optionally in an inert carrier gas into a radio frequency-only quadrupole wherein said gas sample is ionized into multiple ions which are focused by multiple collisions with the carrier gas or a damping gas at a pressure between about $10^{-1}$ and about $10^{-4}$ torr;

(d) conveying the ionized focused gas sample through a focusing element into a mass analyzing quadrupole mass spectrometer which is controlled by both radio frequency and DC; and (e) detecting and measuring the levels of the multiple ion.

13. The method of claim 12 wherein:

in steps (b) and (c) the pressure is between about $10^{-1}$ torr and about $10^{-3}$ torr and the radio frequency is between about 50 kHz and 5 MHz; and in step (d) the pressure is between about $10^{-3}$ torr and about $10^{-6}$ torr, the radio frequency is about 1 MHz, and the DC voltage is between about −600 and +600 volt.

14. The method of claim 12 wherein the mass to charge ratio of the ions analyzed is between about 5 and 2000 amu.

15. The method of claim 12 wherein the temperature in the RF-only quadrupole and in the RF-DC quadrupole is between about 20 and 350° C., and the DC in step (d) is between about −400 volt and +400 volt.

16. The method of claim 12 wherein in step (d) the pressure is between about $10^{-4}$ and about $10^{-5}$ torr.

17. The method of claim 12 wherein the inert carrier gas and the ionizing damping gas are the same gas.

18. The improved method of claim 12 wherein the carrier gas is selected from the group consisting of helium, hydrogen, nitrogen, neon, argon, and mixtures thereof.

19. The improved method of claim 12 wherein the inert carrier gas is helium.

20. The method of claim 19 wherein in step (d) the pressure is between about $10^{-4}$ and about $10^{-5}$ torr.

21. The method of clam 12 wherein in steps (b) and (c) the inert carrier gas is helium, the radio frequency is between about 100 kHz and 1 MHz, and the pressure is between about $10^{-4}$ torr and about $10^{-5}$ torr; and in step (d) the pressure is between about $10^{-4}$ torr and about $10^{-5}$ torr.

22. The method of claim 12 wherein in step (c) the radio frequency is about 1 MHz; and in step (d) the radio frequency is about 1 MHz and the DC voltage is between about −50 volt and +50 volt.

23. The method of claim 12 wherein the sample within said quadrupole is ionized by electron impact ionization.

24. The method of claim 12 wherein the sample within said quadrupole is ionized by chemical ionization.

25. Apparatus for separating and detecting ions formed in a quadrupole, which apparatus comprises:

a radio frequency-only quadrupole having a z-axis acting in an ionization mode to produce multiple ions of an evaporated charge-neutral sample optionally in the presence of an inert carrier gas or a damping gas and to focus the multiple ions toward the z-axis of the quadrupole, and a mass analyzing quadrupole mass spectrometer which is controlled by radio frequency and by DC voltage.

26. The apparatus of claim 25 wherein the radio-frequency-only quadrupole operates at between about $10^{-1}$ torr and about $10^{-3}$ torr at between about 50 kHz and 5 MHz; and the mass analyzing quadrupole mass spectrometer operates at between about 50 kHz and 5 MHz and a DC voltage of between about −600 volt and +600 volt.

27. Apparatus for separating and detecting multiple ions of a sample, comprising:

a radio frequency-only multipole having a z-axis, means for introducing an evaporated charge-neutral sample into said radio frequency-only multipole, optionally in the presence of an inert carrier gas or a damping gas, said radio frequency-only multipole acting in an ionization mode to produce multiple ions of the evaporated charge-neutral sample and to focus the multiple ions toward said z-axis, and a mass analyzing quadrupole mass spectrometer which is controlled by radio frequency and by DC voltage.

28. The apparatus of claim 27 wherein said radio frequency-only multipole operates at between about $10^{-1}$ torr and about $10^{-}$torr with frequency between about 50 kHz and 5 MHz.

29. The apparatus of claim 27 wherein said radio frequency-only multipole comprises at least four poles.

* * * * *